United States Patent
Kawabe et al.

[11] Patent Number: 5,884,987
[45] Date of Patent: Mar. 23, 1999

[54] ANTILOCK BRAKE DEVICE

[75] Inventors: Taketoshi Kawabe; Osamu Isobe; Ikurou Notsu; Sadahiro Takhashi; Masao Nakazawa, all of Ageo, Japan

[73] Assignee: Nissan Diesel Co., Ltd., Ageo, Japan

[21] Appl. No.: 678,103

[22] Filed: Jul. 11, 1996

[30] Foreign Application Priority Data

| Jul. 14, 1995 | [JP] | Japan | 7-209864 |
| Aug. 1, 1995 | [JP] | Japan | 7-226949 |

[51] Int. Cl.$^6$ ............................ B60T 8/30; B60T 8/26
[52] U.S. Cl. ................................. 303/163; 303/165
[58] Field of Search ............... 303/112, 113.2, 303/160, 163, 164, 165, 171, 173, 174; 364/426.018, 426.036; 180/197

[56] References Cited

U.S. PATENT DOCUMENTS

| 4,811,993 | 3/1989 | Matusmoto | 303/112 |
| 5,072,393 | 12/1991 | Mori et al. | 303/163 |
| 5,176,444 | 1/1993 | Kageyama et al. | 303/163 |
| 5,385,393 | 1/1995 | Tanaka et al. | 303/163 |
| 5,474,368 | 12/1995 | Sano | 303/163 |
| 5,494,345 | 2/1996 | Inagaki et al. | 303/163 |
| 5,577,812 | 11/1996 | Hirano et al. | 303/112 |

OTHER PUBLICATIONS

Tan and Chin, Vehicle Traction Control: Variable Structure Control Approach, Trans. of ASME Dynamic Systems, Meas. & Control, vol. 113, pp. 223–230 (1991).

Chin et al., Sliding–Mode ABS Wheel–Slip Control, Proc. of Am. Control. Conf., pp. 1–5 (1992).

*Primary Examiner*—Robert J. Oberleitner
*Assistant Examiner*—Chris Schwartz
*Attorney, Agent, or Firm*—Foley & Lardner

[57] ABSTRACT

In an antilock brake device, a determining function of which the sign varies when a wheel slip ratio is identical to a target value, and a switching function comprising an integral term which is a time integral of the determining function, are set, and a brake torque target value is determined so that it is proportional to the switching function. Alternatively, the brake torque target value computed according to the determining function is corrected according to a wheel angular acceleration. In this way, a brake torque or the wheel slip ratio between a road surface and tires is precisely controlled.

7 Claims, 12 Drawing Sheets

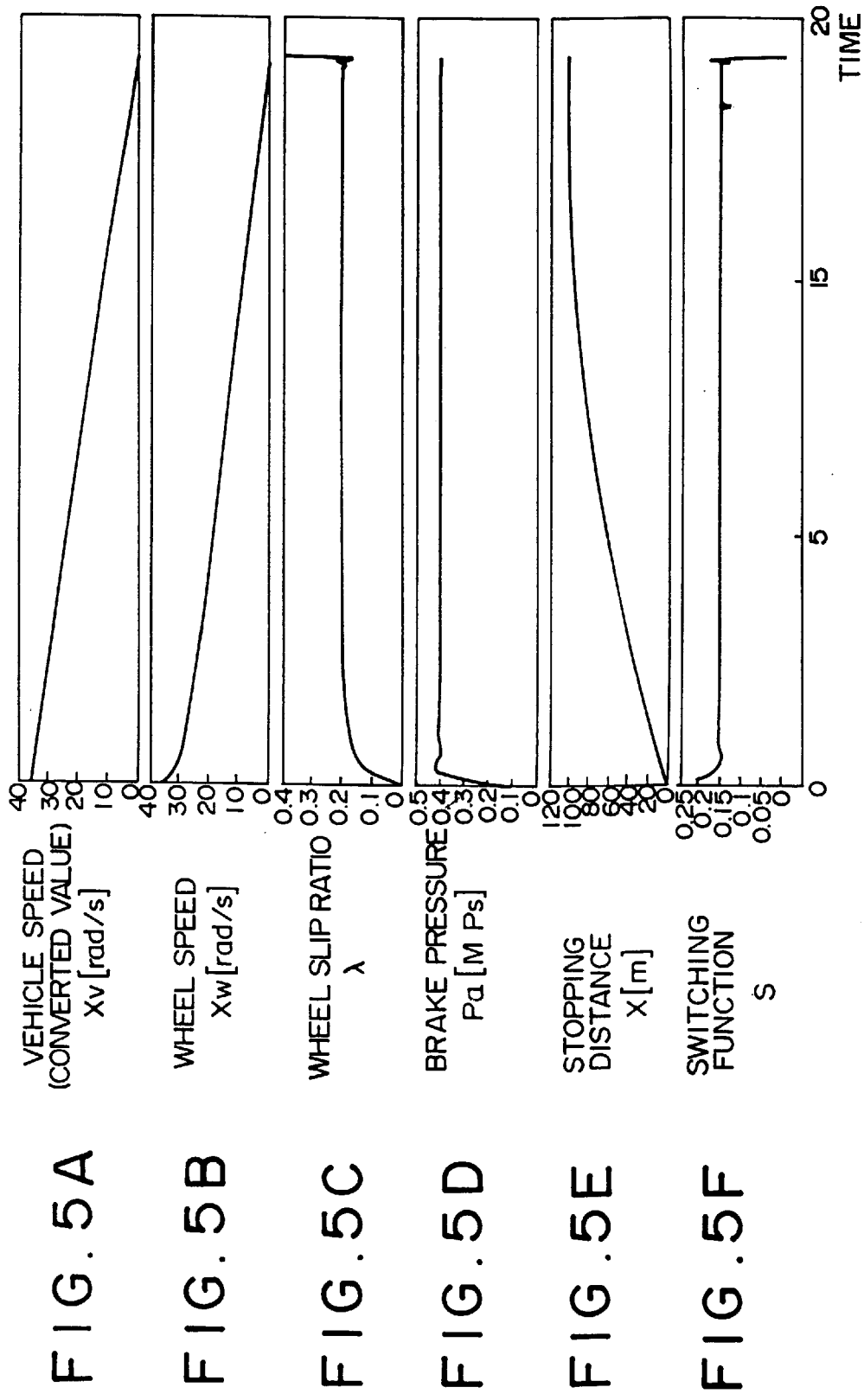

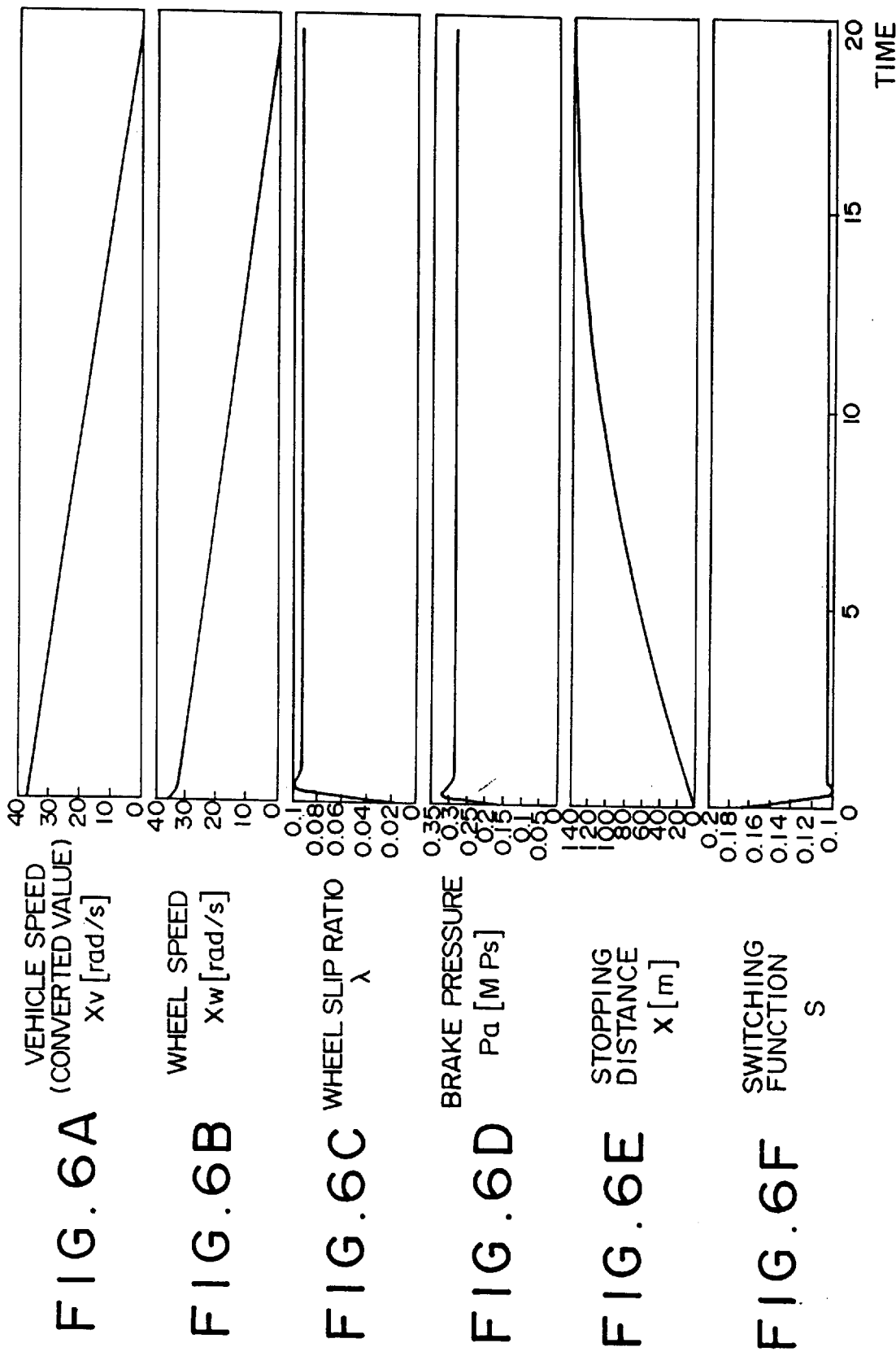

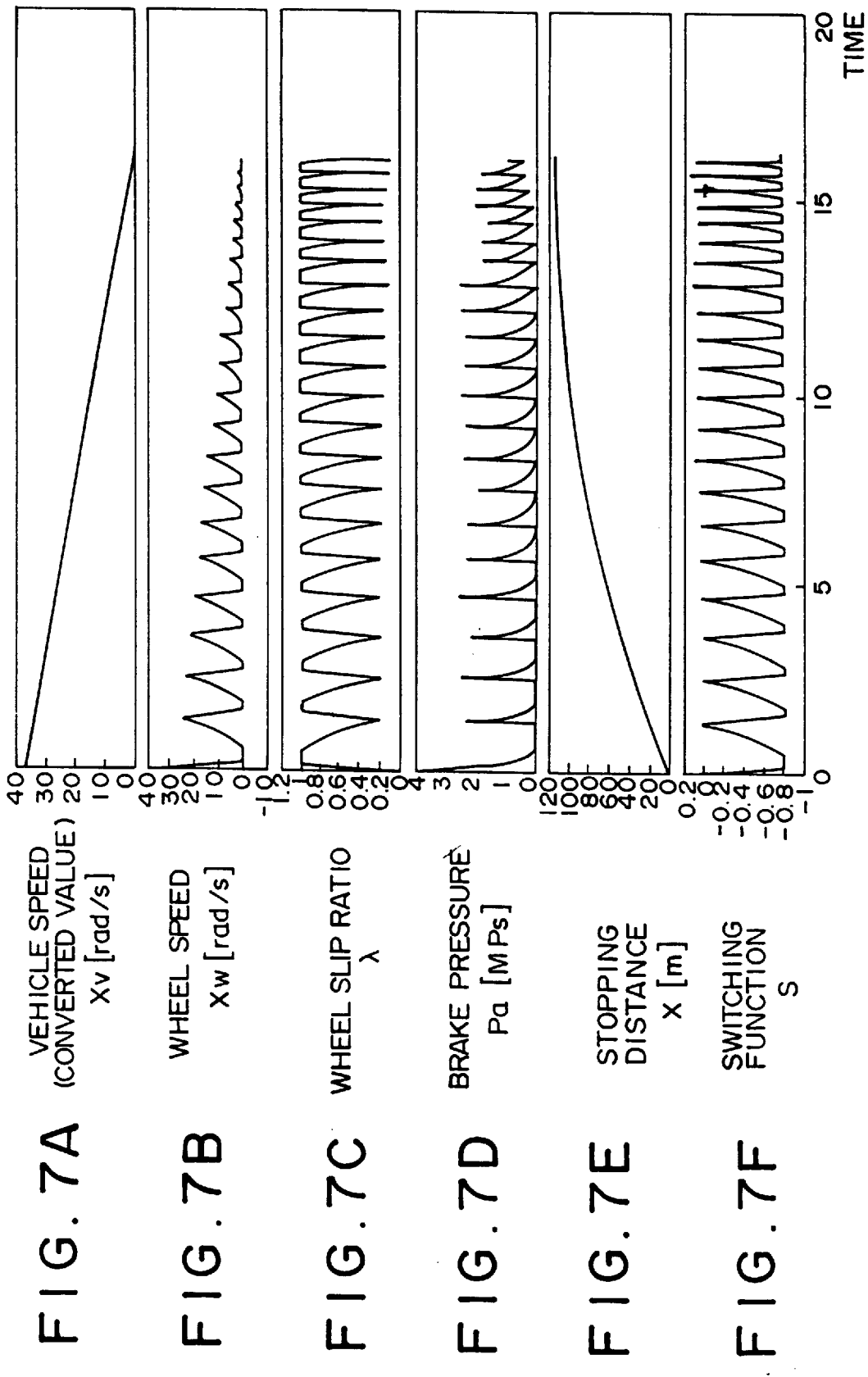

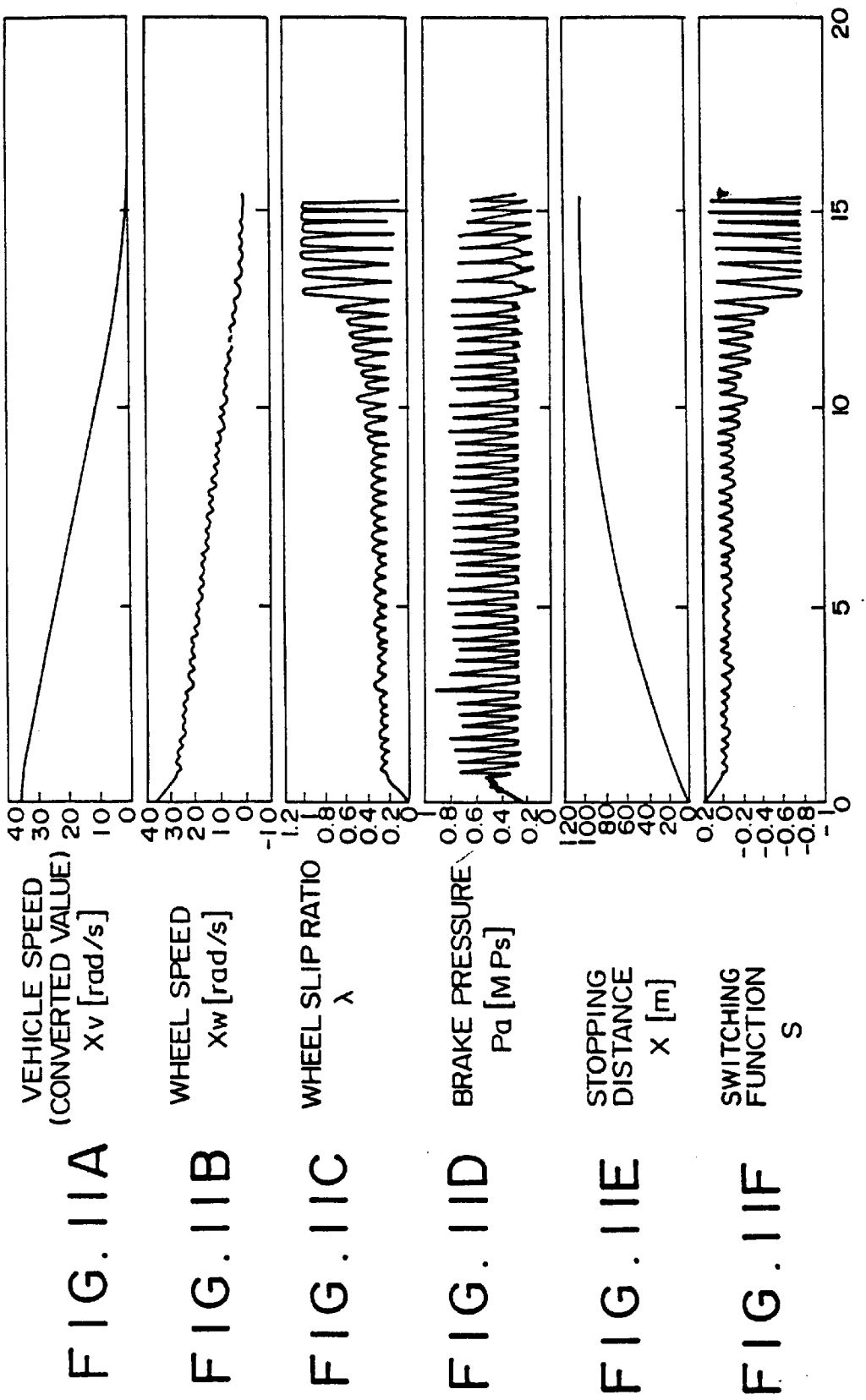
FIG. 11A VEHICLE SPEED (CONVERTED VALUE) Xv [rad/s]
FIG. 11B WHEEL SPEED Xw [rad/s]
FIG. 11C WHEEL SLIP RATIO λ
FIG. 11D BRAKE PRESSURE Pa [MPs]
FIG. 11E STOPPING DISTANCE x [m]
FIG. 11F SWITCHING FUNCTION S

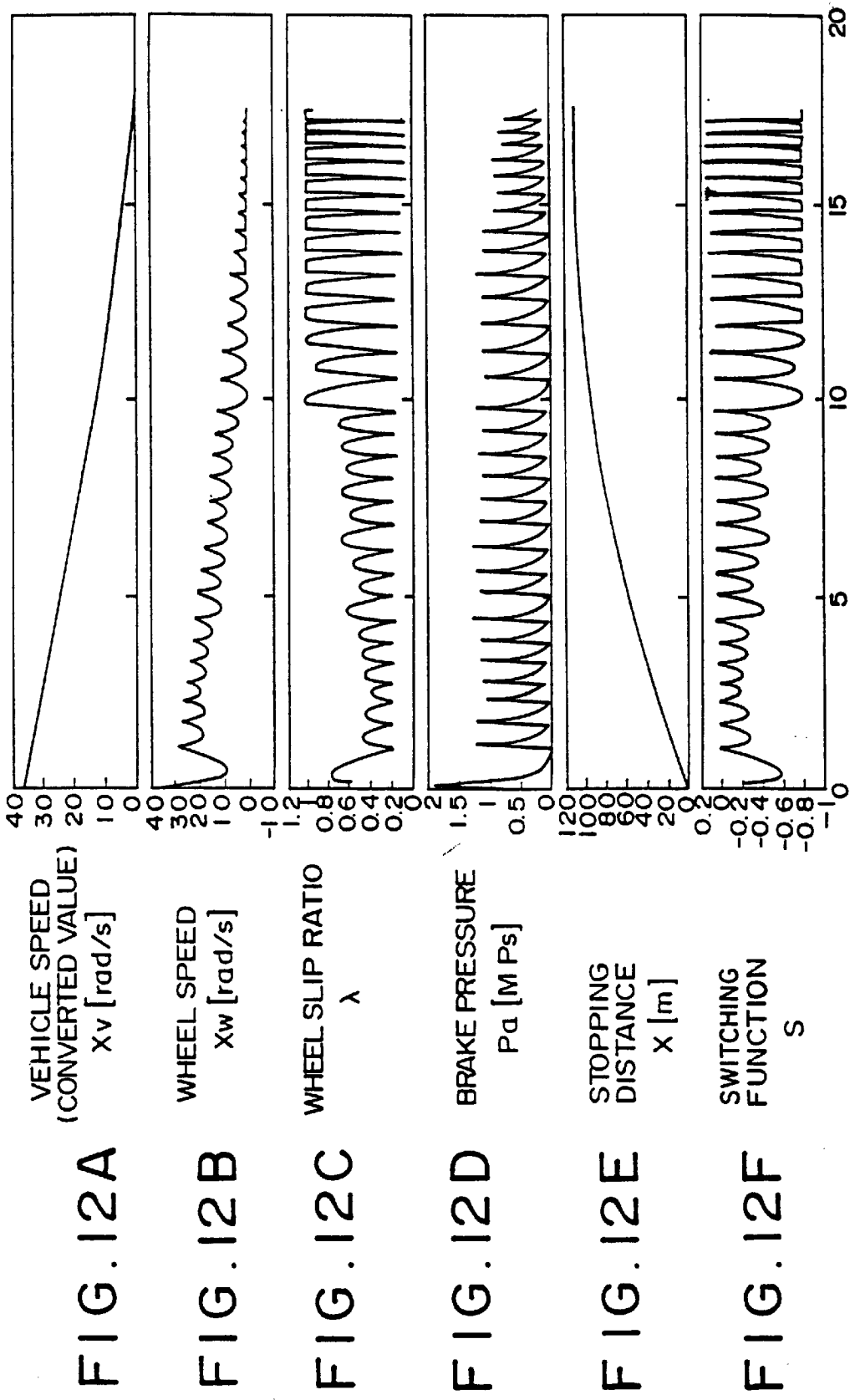

ANTILOCK BRAKE DEVICE

FIELD OF THE INVENTION

This invention relates to a control technique for generating desired brake torque during braking of an automobile.

BACKGROUND OF THE INVENTION

An antiskid brake for feedback control of brake torque based on a difference between wheel speed and vehicle speed of an automobile to prevent the wheels of the automobile from locking during braking, is disclosed for example in the following references:

(1) Tan and Chin: Vehicle Traction Control: Variable Structure Control Approach, Trans. of ASME Dynamic Systems, Measurement and Control, 113, 223/230 (1991), (2) Chin, William, Sidlosky, Rule and Sparschu: sliding-Mode ABS Wheel-Slip Control, Proc. of Am. Control Conf. 1/5 (1992).

In the devices disclosed in these references, a function having vehicle speed and wheel speed as arguments is set, and a wheel slip ratio between the road surface and tires is controlled to a target value by switching the brake torque depending on whether the function is positive or negative as shown by the graph (b) of FIG. 13. However, there is a delay in brake torque generation due to the delay of an actuator that generates a brake torque or due to the time required to calculate the function, and this tends to cause oscillation (known in the art as "hunting") of the brake torque or wheel slip ratio.

To suppress such an unfavorable oscillation, the characteristics of the function may be set so that the brake torque is not changed over abruptly, but is made to vary smoothly from a maximum value to a minimum value as shown by the graph (a) of FIG. 13. However, when the brake torque is varied gradually, the control error increases so the target value and actual value of the wheel slip ratio may not precisely coincide with one another.

SUMMARY OF THE INVENTION

It is therefore an object of this invention to precisely control a wheel slip ratio between a road surface and a tire.

It is a further object of this invention to make a braking distance short.

In order to achieve the above objects, this invention provides an antilock brake device comprising a mechanism for detecting a wheel speed, a mechanism for detecting a vehicle speed, a mechanism for calculating a wheel slip ratio from the wheel speed and the vehicle speed, and a mechanism for controlling a brake torque such that the wheel slip ratio is identical with a predetermined target value.

The device further comprises a mechanism for setting a determining function whereof the sign varies when the wheel slip ratio is identical to the target value, a mechanism for setting a switching function comprising an integral term comprising a time integral of the determining function, a mechanism for determiing a brake torque target value according to the value of the switching function, and a mechanism for controlling the brake torque to the brake torque target value.

It is preferable that the determining function, the switching function, and wheel slip ratio are respectively defined by the following equations (A), (B) and (C):

(A): $\sigma(t) = \eta \cdot x_V(t) + x_W(t)$ wherein:
$\eta = \lambda_0 - 1$
$\sigma(t)$: determining function
$x_V(t)$: vechile speed
$x_W(t)$: wheel speed
$\lambda_0$: target wheel slip ratio (B): $s(t) = \sigma(t) + k_l \cdot \int_{t_0}^{t} \sigma(t) dt$ wherein:
s(t): switching function
$k_l$: constant (C): $\lambda = \dfrac{x_V(t) - x_W(t)}{x_V(t)}$ wherein:
$\lambda$ = wheel slip ratio It is further preferable that the brake torque target value is determined by the following equation (D):

(D): $u_{cmd}(t) = J_W \cdot q(t)$ wherein:

$$q(t) = \begin{cases} q^+ & s(t) > \delta \\ f(s) & 0 \leq s(t) \leq \delta \\ q^- & s(t) < 0 \end{cases}$$

$J_w$, $q^+$, $q^-\delta$: constants
$u_{cmd}(t)$: brake torque target value
f(s): monotonic increasing function where $f(0) = q^-$, $f(\delta) = q^+$ According to another aspect of this invention, the antilock brake device comprises a mechanism for setting a determining function whereof the sign varies when the wheel slip ratio is identical to the target value, a mechanism for computing a brake torque target value according to the value of the determining function, a mechanism for detecting a wheel angular acceleration, a mechanism for correcting the brake torque target value by a correction value according to the angular acceleration, and a mechanism for controlling the brake torque to the brake torque target value.

It is preferable that the switching function is defined by the following equations (E) and (F):

(E): $s(t) = \eta \cdot x_V(t) + x_W(t)$ wherein:
$\eta = \lambda_0 - 1$
s(t): switching function
$x_V(t)$: vehicle speed
$x_W(t)$: wheel speed
$\lambda_0$: target wheel slip ratio (C): $\dfrac{x_V(t) - x_W(t)}{x_V(t)}$ wherein:
$\lambda$: wheel slip ratio It is further preferable that the computation and correction of the brake torque target value are performed by the following equation (G):

(G): $u_{cmd}(t)=J_W\{v(t)+k_W\dot{x}_W\}$ wherein:

$$v(t) = \begin{cases} v^+ & s(t) \\ v^- & s(t) \end{cases}$$

$J_W$, $v^+$, $v^-$, $k_W$: constant
$\dot{x}_W$: wheel angular acceleration
$u_{cmd}(t)$: brake torque target value The details as well as other features and advantages of this invention are set forth in the remainder of the specification and are shown in the accompanying drawings.

BRIEF DESCRIPTION OF THE DRAWINGS

FIGS. 5A–5F are diagrams showing simulation results of antilock brake control characteristics according to this invention.

FIGS. 6A–6F are similar to FIGS. 5A–5F, but showing simulation results when an integral term is detached.

FIGS. 7A–7F are similar to FIGS. 6A–6F, but showing simulation results when a constant δ is 0.

FIGS. 11A–11F are diagrams showing simulation results of antilock brake control characteristics when a feedback gain $k_W$ is 0 according to the second embodiment of this invention.

FIGS. 12A–12F are similar to FIGS. 11A–11F, but showing simulation results when the feedback gain $k_W$ is 0.3.

DESCRIPTION OF THE PREFERRED EMBODIMENTS

Figure 1:
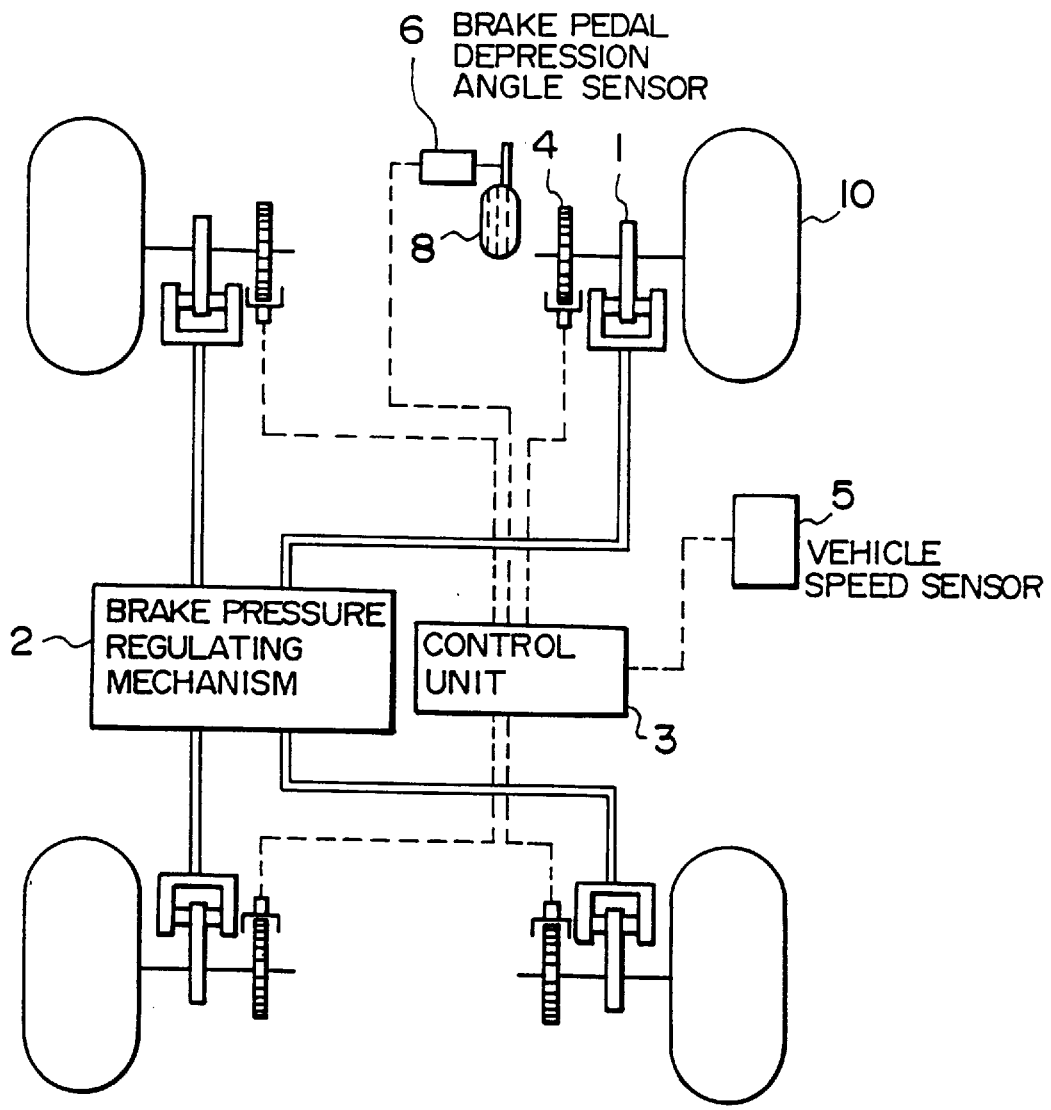
FIG. 1 Is a schematic diagram of the construction of an antilock brake device according to this invention.

Referring to FIG. 1–FIG. 7 of the drawings, a brake 1 brakes a wheel 10 by oil pressure via a brake pressure regulating mechanism 2. The brake pressure regulating mechanism 2 comprises for example an oil pressure pump and servopump or the like, and it supplies a pressure proportional to a signal output by a control unit 3 to the brake 1.

Signals from a wheel speed sensor 4 which detects a rotation speed $x_W(t)$ of the wheel 10, a vehicle speed sensor 5 which detects a speed $x_V(t)$ of the vehicle chassis and a brake pedal depression angle sensor 6 which detects a depression angle θ(t) of a brake pedal 8, are input to the control unit 3. The vehicle speed sensor 5 may comprise for example an acceleration sensor which detects an acceleration in the forward/reverse direction acting on the vehicle, and an integrator which integrates this output.

The control unit 3 comprises for example a microcomputer which calculates a target brake torque $u_{cmd}(t)$ from the input signals, i.e. wheel speed $x_W(t)$, vehicle speed $x_V(t)$ and brake pedal depression angle θ(t) using the equations (1)–(7) below, and outputs a signal to the brake pressure regulating mechanism 2. The brake 1 and wheel speed sensor 4 are installed on each of the wheels 10 and a brake pressure signal is output to each of the wheels 10.

$$\sigma_i(t)=\eta \cdot x_V(t)+x_{wi}(t) \tag{1}$$

Herein, i is a subscript showing the wheel number. For example, when there are four wheels, let the wheel speed of the right front wheel #1 be $x_{w_1}(t)$, the wheel speed of the left front wheel #2 be $x_{w_2}(t)$, the wheel speed of the right rear wheel #3 be $x_{w_3}(t)$ and the wheel speed of the left rear wheel #4 be $x_{w_4}(t)$. The determining function $\sigma_i$ is calculated for each wheel. η is a predetermined value that is calculated from a target value $\lambda_0$ of the wheel slip ratio between the road surface and tires using the following equation:

$$\eta=\lambda_0-1$$

The wheel slip ratio $\lambda_i$ between the road surface and tires is defined by the following equation:

$$\lambda_i = \frac{x_v(t) - x_{w_i}(t)}{x_v(t)} \tag{2}$$

By definition, $\sigma_i(t)=0$ signifies that the wheel slip ratio $\lambda_i$ is identical to the target value $\lambda_0$. $\sigma_i(t)>0$ signifies that the wheel slip ratio is less than the target value, and $\sigma_i(t)<0$ signifies that the wheel slip ratio is larger than the target value.

Next, a switching function $s_i(t)$ is computed from the following equation:

$$s_i(t) = \sigma_i(t) + k_I \cdot \int_{t_0}^{t} \sigma_i(t)dt \tag{3}$$

where, t is the present time, and $k_I$ is a predetermined positive integer.

The brake torque target value $u_{cmd_i}(t)$ for each wheel is determined from the following equations:

$$u_{cmd_i}(t)=J_W \cdot q_i(t) \tag{4}$$

$$q_i(t) = \begin{cases} q_i^+ & s_i(t) > \delta \\ f(s_i) & 0 \leq s_i(t) \leq \delta \\ q_i^- & s_i(t) < 0 \end{cases} \tag{5}$$

Herein, $f(s_i)$ is a smooth monotonic increasing function which satisfies $f(0)=q_i^-$, $f(\delta)=q^+$. δ is a positive predetermined value. $q_i^+$, $q_i^-$ are constants which satisfy the following conditions:

$$q_i^+ > \eta \cdot \dot{x}_V(t)+f_{\mu_i}-f_{resist_i}+k_I\sigma_i(t) \tag{6}$$

$$q_i^- < \eta \cdot \dot{x}_V(t)+f_{\mu_i}-f_{resist_i}+k_I\sigma_i(t) \tag{7}$$

Figure 4:
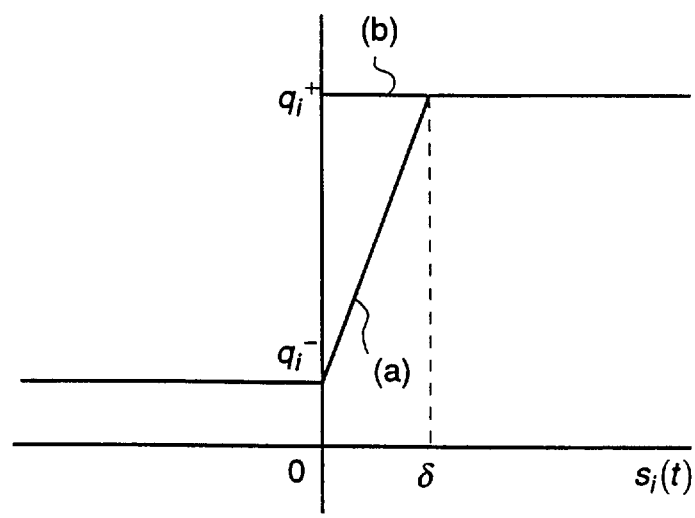
FIG. 4 is a graph showing the characteristics of a switching function according to this invention.

Herein, $f_{\mu_i}$ is a force in the forward/reverse direction that the road surface applies to the i-th wheel, and $f_{resist_i}$ is a rolling resistance of the i-th wheel. In all cases, $f_{\mu_i}$, $f_{resist_i}$, $\dot{x}_V$, $\sigma_i$ have finite values, so there are always values of $q_i^+$, $q_i^-$ which satisfy equations (6) and (7). Expressing equation (5) diagramatically, the graph (a) of FIG. 4 is obtained.

The calculation and control performed by the control unit 3 will now be described with reference to the flowcharts of FIG. 2 and 3.

Figure 2:
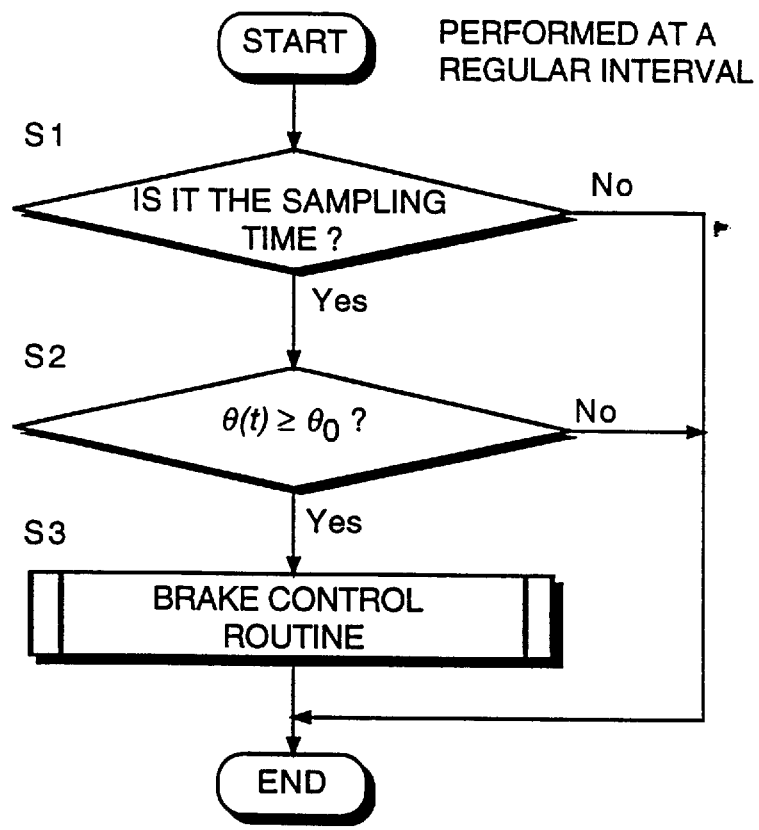
FIG. 2 is a flowchart describing a basic routine of antilock control according to this invention.

First, the flowchart of FIG. 2 is a basic routine. In a step S1, it is determined whether or not the time is a sampling time. This step is provided so that the routine is performed at regular intervals. At a sampling time, it is determined in a step S2 whether or not the brake pedal depression angle $\theta(t)$ is equal to or greater than a predetermined value $\theta_0$. In general, antilock control is required when the brake pedal is depressed greater than a certain amount. In other cases, antilock control is not required, so the routine is terminated without performing the subsequent brake torque control.

Figure 3:
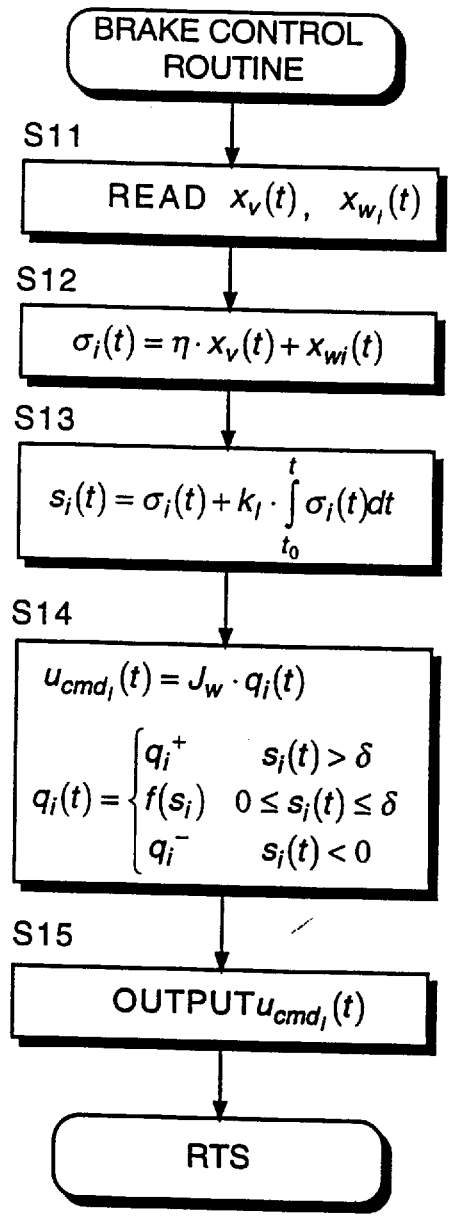
FIG. 3 is a flowchart describing a brake torque control routine according to this invention.

When the brake pedal depression angle $\theta(t)$ is equal to $\theta_0$ or greater, a brake control routine shown in FIG. 3 is performed in a step S3.

Herein, the wheel speed $x_{W_i}(t)$ and vehicle speed $x_V(t)$ are read in a step S11. Subsequently, the calculations (1)–(7) are performed in steps S12–S15, and the brake torque target value $u_{cmd_i}(t)$ for each wheel is calculated. The brake torque target value $u_{cmd_i}(t)$ is then output to the brake pressure regulating mechanism 2 in the step S15.

The brake pressure regulating mechanism 2 regulates the oil pressure supplied to the brake 1 of each wheel so that the brake torque target value $u_{cmd_i}(t)$ is obtained.

Herein, when the number of wheels on the vehicle is $\eta_W$, the braking motion equation may be expressed as follows:

$$\dot{x}_v(t) = -c_1 \cdot \sum_{i=1}^{\eta_w} f_{\mu i} - f_{aero} - c_1 \cdot \sum_{i=1}^{\eta_w} f_{resist_i} + f_g \quad (8)$$

$$\dot{x}_{W_i}(t) = f_{\mu_i} - f_{resist_i} - q_i(t) \quad (x_v > 0, x_{W_i} > 0) \quad (9)$$

wherein:

$$f_{\mu_i} = \frac{R_w}{J_w} \cdot F_{V_i} \cdot \mu_i(\lambda_i) \quad f_{resist_i} = \frac{R_w}{J_w} \cdot F_{V_i} \cdot B_{r_i}$$

$$f_{aero} = \frac{R_w}{J_w} \cdot B_V \cdot x_v^2 \quad f_g = g \cdot \frac{\sin(\theta)}{R_w}$$

$$q_i(t) = \frac{1}{J_w} \cdot u_i \quad c_I = \frac{J_w}{R_w^2 \cdot M_v} \quad \lambda_i = \frac{x_v(t) - x_{W_i}(t)}{x_v(t)}$$

where,
  $x_V$: vehicle speed (rotation angle speed conversion value)
  $u_i$: brake torque of i-th wheel
  $B_V$: air resistance coefficient
  $J_W$: moment of inertia of wheel
  $\mu_i(\lambda_i)$: frictional coefficient between i-th wheel and road surface
  $F_{V_i}$: wheel load of i-th wheel
  $\theta$: road surface slope
  $x_{W_i}$: wheel speed of i-th wheel
  $M_V$: vehicle mass
  $B_{r_i}$: rolling resistance coefficient of i-th wheel
  $R_W$: wheel radius
  $\lambda_i$: wheel slip ratio of i-th wheel
  $\eta_W$: number of wheels Now, consider the quantity $V_i(t) = s_i(t)^2$. From the definition, it is clear that $V_i(t) \geq 0$. When the time increment $\dot{V}_i(t)$ of $V_i(t)$ is always $\dot{V}_i(t) \leq 0$, $V_i(t)$ decreases and $$\lim_{t = \infty} V_i(t) = C \text{(constant value)}$$

$s_i(t)$ is then also a constant value. By definition, $s_i(t)$ can be a constant value only when $\lambda_i = \lambda_0$.

The condition for which $\dot{V}_i(t) \leq 0$ always holds will now be found.

Since:

$$\dot{V}_i(t) = \dot{s}_i(t) \leq 0$$

$\dot{s}_i(t)$ should be less than 0 when $s_i(t) \geq 0$, and $\dot{s}_i(t) \geq 0$ when $s_i(t) \leq 0$. First, consider the case when $s_i(t) < 0$. Rewriting $\dot{s}_i(t)$:

$$\dot{s}_i(t) = \eta \dot{x}_v(t) + \dot{x}_{w_i}(t) + k_I \cdot \sigma_i(t) \quad (10)$$
$$= \eta \cdot \dot{x}_v(t) + f_{\mu_i} - f_{resist_i} - q_i(t) + k_I \cdot \sigma_i(t)$$

Substituting $q_i(t)$ of equation (5) in equation (10), it is evident that $\dot{s}_i(t) > 0$. Likewise, when $s_i(t) > \delta$, it is evident that $\dot{s}_i(t) < 0$.

From equation (10), it is understood that in the range $0 \leq s_i(t) \leq \delta$, there is an equilibrium point P at which $\dot{s}_i(t) = 0$ when $q_i(t) = u_{i0}$ $(q_i^- < u_{i0} < q_i^+)$. When $s_i(t) < 0$ and $s_i(t) > \delta$, therefore, $V_i(t)$ decreases monotonically, and is stable at the equilibrium point P in the range $0 \leq s_i(t) \leq \delta$. As $V_i(t)$ is stable, $s_i(t)$ is also stable at a constant value. This means that $\lambda_i = \lambda_0$. In this way, the wheel slip ratio $\lambda_i$ is precisely controlled to the target value $\lambda_0$.

FIGS. 5A–5F shows the results of simulating the aforesaid control when the target wheel slip ratio $\lambda_0$ is 0.2.

Herein, the wheel slip ratio $\lambda$ is rapidly controlled to the target value of 0.2, and the stopping distance x on braking is 100 m.

FIGS. 6A–6F showing the simulation results under the same conditions when the integral term of equation (3) is detached. FIG. 7 shows the simulation results when a in equation (5) is 0, i.e. when the characteristics of the switching function are set as shown by the graph (b) of FIG. 4.

When the integral term in equation (3) is detached and $\delta$ in equation (5) is set to 0, oscillation of the wheel slip ratio $\lambda$ occurs as shown in FIG. 7, and the brake torque largely varies accordingly as shown in FIG. 7D. The stopping distance x on braking is 110 m as shown in FIG. 7E.

During control when $\delta$ is not 0 and only the integral term in equation (3) is detached, oscillation of the wheel slip ratio $\lambda$ does not occur as shown in FIG. 6C, but as the wheel slip ratio is stable at a position offset from the target wheel slip ratio $\lambda_0 = 0.2$, the stopping distance largely increases to x=140 m.

Hence, by providing an integral term in the switching function, the braking distance is reduced and stable braking can be achieved.

Next, a second embodiment of this invention will be described with reference to FIG. 8–FIG. 12F.

The difference in hardware from the aforesaid first embodiment shown in FIG. 1 is that an angular acceleration sensor 7 is additionally provided that detects an angular acceleration $\dot{x}_W$ of each wheel 10, and outputs it to the control unit 3.

The control unit 3 calculates the target brake torque $u_{cmd_i}(t)$ from the input signals, i.e. wheel speed $x_W(t)$, vehicle speed $x_V(t)$, brake pedal depression angle $\theta(t)$ and wheel angular acceleration $\dot{x}_W$ using the equations (11)–(17) below, and outputs a signal to the brake pressure regulating mechanism 2.

$$s_i(t) = \eta \cdot x_v(t) + x_{w_i}(t) \tag{11}$$

Herein, i is a subscript showing the wheel number. For example, when there are four wheels, let the wheel speed of the right front wheel #1 be $x_{W_1}(t)$, the wheel speed of the left front wheel #2 be $x_{W_2}(t)$, the wheel speed of the right rear wheel #3 be $x_{W_3}(t)$ and the wheel speed of the left rear wheel #4 be $x_{W_4}(t)$. The switching function $s_i(t)$ is calculated for each wheel. $\eta$ is a predetermined value which is calculated from a target value $\lambda_0$ of the wheel slip ratio between the road surface and tires using the following equation:

$$\eta = \lambda_0 - 1$$

The wheel slip ratio $\lambda_i$ between the road surface and tires is defined by the following equation:

$$\lambda_i = \frac{x_v(t) - x_{w_i}(t)}{x_v(t)} \tag{12}$$

By definition, $\delta_i(t)=0$ signifies that the wheel slip ratio $\lambda_i$ is identical to the target value $\lambda_0$.
$s_i(t) \leq 0$ signifies that the wheel slip ratio is less than the target value, and $s_i(t) < 0$ signifies that the wheel slip ratio is larger than the target value.

The brake torque target value $u_{cmd_i}(t)$ for each wheel is determined from the following equations:

$$u_{cmd_i}(t) = J_w \cdot q_i = J_w \{v_i(t) + k_w \cdot \dot{x}_{w_i}\} \tag{13}$$

$$v_i(t) = \begin{cases} v_i^+ > 0 \\ v_i^- < 0 \end{cases} \tag{14}$$

where, $k_w$ is a positive predetermined value, and the wheel angular acceleration $\dot{x}_{w_i}$ is a feedback gain which is fed back to the brake torque. $v_i^+$, $v_i^-$ are constants which satisfy the following conditions:

$$v_i^+ > (1+k_W) \cdot \eta \cdot \dot{x}_v(t) + f_{\mu i} - f_{resist_i} \tag{15}$$

$$v_i^- < (1+k_W) \cdot \eta \cdot \dot{x}_v(t) + f_{\mu i} - f_{resist_i} \tag{16}$$

Figure 10:
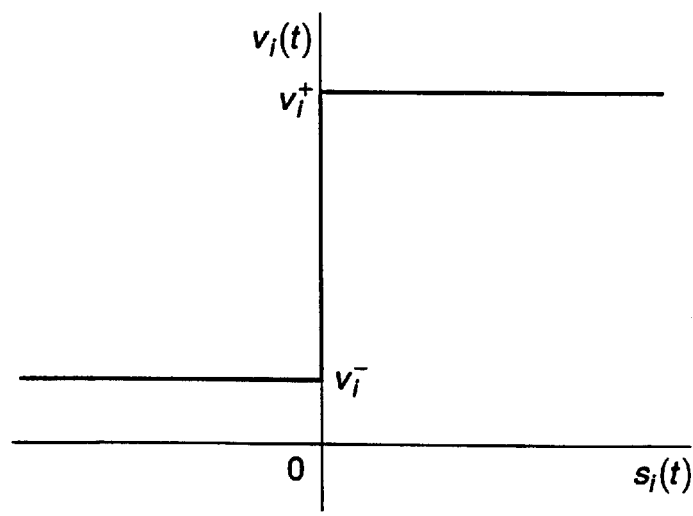
FIG. 10 is a graph showing the characteristics of $v_i(t)$ according to the second embodiment of this invention.
Figure 8:
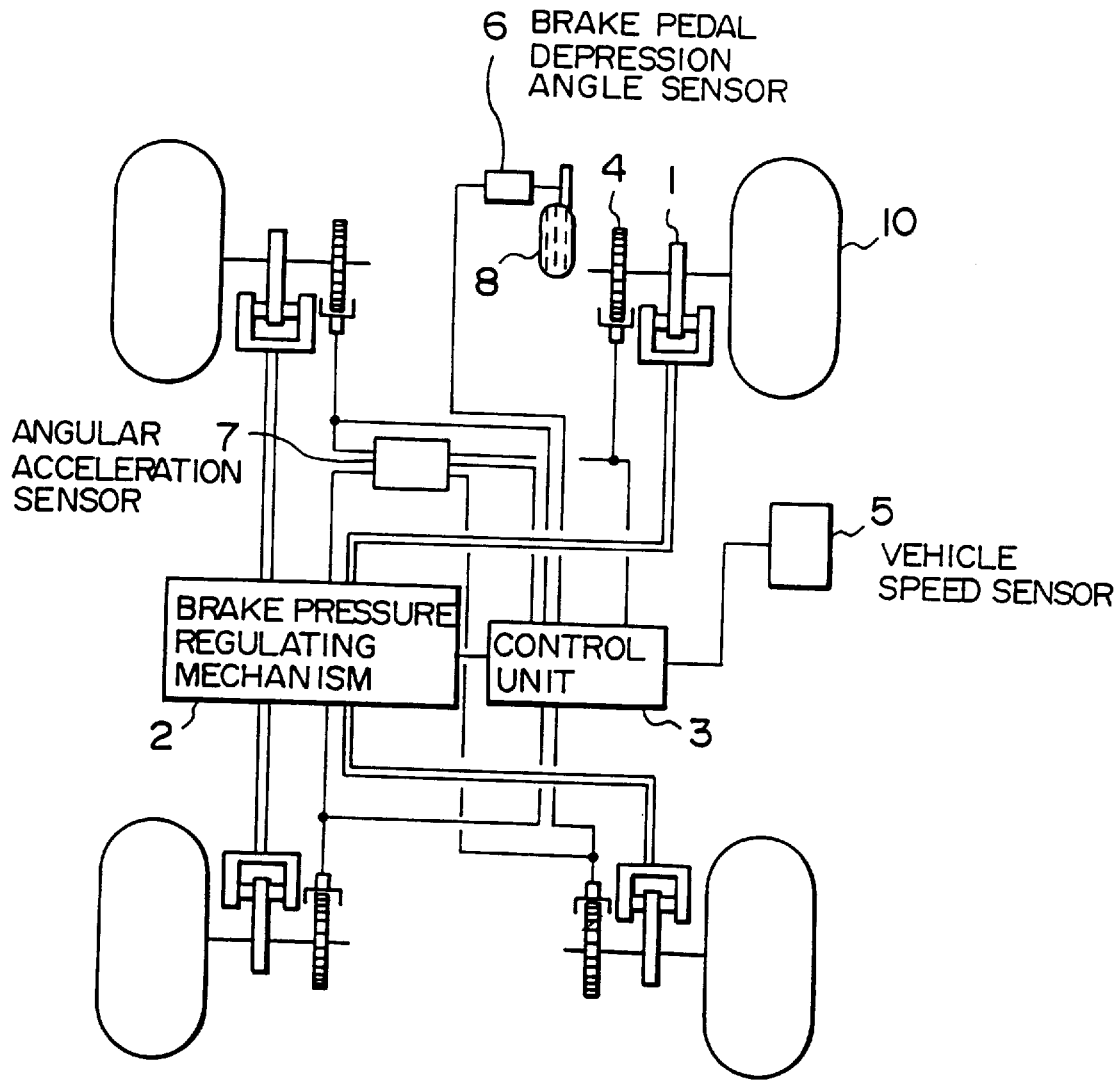
FIG. 8 is a schematic view of the construction of an antilock brake according to a second embodiment of this invention.

Herein, $f_{\mu_i}$ is a force in the forward/reverse direction that the road surface applies to the i-th wheel, and $f_{resist_i}$ is a rolling resistance of the i-th wheel. In all cases, $f_{\mu_i}$, $f_{resist_i}$, si have finite values, so there are always values of $v_i^+$, $v_i^-$ which satisfy equations (15) and (16). Expressing equation (14) diagramatically, the graph of FIG. 10 is obtained.

The basic routine of the processing performed by the control unit 3 is the same as that of the aforesaid first embodiment shown in FIG. 2. However, in this embodiment, the brake control routine performed in the step S3 is different.

Figure 9:
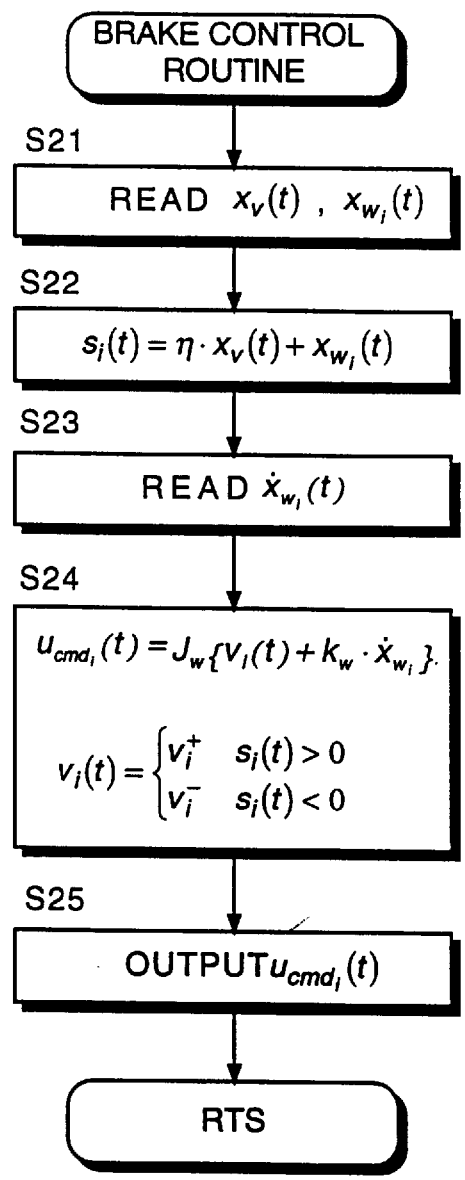
FIG. 9 is a flowchart describing a basic antilock control routine according to the second embodiment of this invention.
Figure 13:
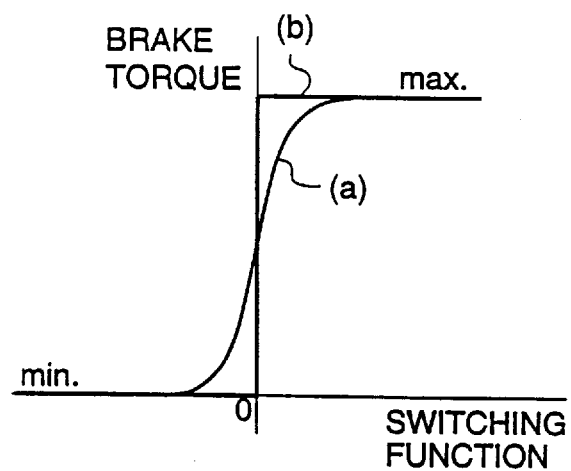
FIG. 13 is a graph showing brake torque control characteristics according to the prior art.

This difference will now be explained. Referring to FIG. 9, the wheel speed $x_{W_i}(t)$ and vehicle speed $x_v(t)$ are first read in a step S21. Subsequently, the calculations (11)–(16) are performed in steps S22–S25, and the brake torque target value $u_{cmd_i}(t)$ for each wheel is calculated. The brake torque target value $u_{cmd_i}(t)$ is then output to the brake pressure regulating mechanism 2 in the step S25.

The brake pressure regulating mechanism 2 regulates the oil pressure supplied to the brake 1 of each wheel so that the brake torque target value $u_{cmd_i}(t)$ is obtained.

Herein, when the brake torque is defined by equation (14), the wheel slip ratio $\lambda_i$ approaches the target value $\lambda_0$.

To explain the reason for this, when the number of wheels on the vehicle is $\eta_W$, the braking motion equation may be expressed as follows:

$$\dot{x}_v(t) = -c_1 \cdot \sum_{i=1}^{\eta_w} f_{\mu_i} - f_{aero} - c_1 \cdot \sum_{i=1}^{\eta_w} f_{resist_i} + f_g \tag{17}$$

$$\dot{x}_{w_i}(t) = f_{\mu_i} - f_{resist_i} - q_i(t) \quad (x_v > 0, x_{w_i} > 0) \tag{18}$$

wherein:

$$f_{\mu_i} = \frac{R_w}{J_w} \cdot F_{v_i} \cdot \mu_i(\lambda_i) \quad f_{resist_i} = \frac{R_w}{J_w} \cdot F_{v_i} \cdot B_{r_i}$$

$$f_{aero} = \frac{R_w}{J_w} \cdot B_V \cdot x_v^2 \quad f_g = g \cdot \frac{\sin(\theta)}{R_w}$$

$$q_i(t) = \frac{1}{J_w} \cdot u_i \quad c_1 = \frac{J_w}{R_w^2 \cdot M_v} \quad \lambda_i = \frac{x_v(t) - x_{w_i}(t)}{x_v(t)}$$

where,
$x_V$: vehicle speed (rotation angle speed conversion value)
$u_i$: brake torque of i-th wheel
$B_V$: air resistance coefficient
$J_W$: moment of inertia of wheel
$\mu_i(\lambda_i)$: frictional coefficient between i-th wheel and road surface
$F_{V_i}$: wheel load of i-th wheel
$\theta$: road surface slope
$x_{W_i}$: wheel speed of i-th wheel
$M_V$: vehicle mass
$B_{r_i}$: rolling resistance coefficient of i-th wheel
$R_W$: wheel radius
$\lambda_i$: wheel slip ratio of i-th wheel
$\eta_W$: number of wheels Now, define a quantity $V_i(t) = s_i(t)^2$. By definition, it is clear that $V_i(t) \geq 0$. When the time increment $\dot{V}_i(t)$ is always $\dot{V}_i(t) < 0$, $V_i(t)$ decreases and $$\lim_{t = \infty} V_i(t) = 0$$

$s_i(t)^2$ then goes to 0, i.e. $\lambda_i = \lambda_0$.
More specifically, the condition for which $\dot{V}_i(t) < 0$ always holds will now be found. Since:

$$\dot{V}_i(t) = 2 s_i(t) \cdot \dot{s}_i(t)$$

$\dot{s}_i(t)$ should be less than 0 when $s_i(t) > 0$, and $\dot{s}_i(t) > 0$ when $s_i(t) < 0$.
First, consider the case when $s_i(t) < 0$. Rewriting $\dot{s}_i(t)$.

$$\begin{aligned} \dot{s}_i(t) &= \eta \cdot \dot{x}_v(t) + \dot{x}_{w_i}(t) \\ &= \eta \cdot \dot{x}_v(t) + \frac{1}{1+k_w} \cdot \{f_{\mu_i} - f_{resist_i} - v_i(t)\} \end{aligned} \tag{19}$$

This is due to the fact that when $$q_i = k_W \cdot \dot{x}_{W_i} + v_i$$

is substituted in equation (18), $$\dot{x}_{w_i} = \frac{1}{1+k_w} \cdot \{f_{\mu_i} - f_{resist_i} - v_i(t)\} \tag{20}$$

is obtained.
Substituting $v_i(t)$ of equation (14) in equation (19), it is evident that $\dot{s}_i(t)$ due to the relation with equation (16). Likewise, it is evident that when $s_i(t) > 0$, $\dot{s}_i(t) < 0$.
Hence, if this kind of brake torque change-over is possible, $V_i(t)$ decreases monotonically and $\lambda_i = \lambda_0$.

However, there is always a detection delay in the detected values of wheel speed and vehicle speed compared to their real values. Also, when a digital processor is used as the computing unit, control is performed at regular intervals and a control signal is not output between control periods. There is moreover a delay in the actuator generating the brake torque. Consequently, there is always a delay in brake torque genetating.

For this reason, the wheel slip ratio is either too large or too small compared to the target value, the brake torque fluctuates, and oscillation of the wheel slip ratio occurs in the vicinity of the target value.

FIGS. 11A–11F and FIGS. 12A–12F show simulation results for brake torque control according to this embodiment when the target wheel slip ratio $\lambda_0$ is 0.2.

FIGS. 11A–11F show the simulation results when $k_W$, in equation (13) is 0.3. Herein, oscillation of the wheel slip ratio was reduced, and the stopping distance x on braking was 102 m.

FIGS. 12A–12F show the simulation results when $k_W$ is 0. In this case, oscillation of the wheel slip ratio $\lambda$ occurs as shown in FIG. 12C, and the brake pressure largely varies accordingly as shown in FIG. 12D. The stopping distance x on braking was 110 m as shown in FIG. 12E.

According to this invention, the wheel angular acceleration $\dot{x}_W$ is fed back to the brake torque, the moment of inertia of wheel rotation becomes larger by an equivalent amount, and the variation of wheel speed relative to $f_{\mu_i}$, $f_{resist_i}$ and $V_i(t)$ is reduced. It is clear from equation (20):

$$\dot{x}_{W_i} = \frac{1}{1 + k_W} \cdot \{f_{\mu_i} - f_{resist_i} - v_i(t)\} \quad (20)$$

that $\dot{x}_{W_i}$ is smaller when $k_W > 0$ than when $k_W = 0$.

Hence, when the wheel slip ratio is in the vicinity of the target value, there is not much fluctuation of $\dot{x}_W$ even when there is a delay in the appearance of $v_i(t)$, and oscillation is alleviated.

The embodiments of this invention in which an exclusive property or privilege is claimed are defined as follows:

1. An antilock brake device comprising:

a first sensor for detecting a wheel speed, a second sensor for detecting a vehicle speed, a controller configured to:

calculate a wheel slip ratio from said wheel speed and said vehicle speed, set a determining function which takes a positive value when said wheel slip ratio is less than said target value, and which takes a negative value when said wheel slip ratio is larger than said target value, set a switching function comprising a time integral of said determining function, and determine a brake torque target value according to the value of said switching function, and a brake torcrue generating mechanism for generating a brake torque corresponding to said brake torque target value.

2. An antilock brake device as defined in claim 1, wherein said determining function, said switching function and said wheel slip ratio are respectively defined by the following equations (A), (B) and (C):

$$(A): \sigma(t) = \eta \cdot x_V(t) + x_W(t)$$

wherein:
$\eta = \lambda_0 - 1$
$\eta(t)$: determining function $x_V(t)$: vechile speed
$x_W(t)$: wheel speed
$\lambda_0$: target wheel slip ratio $$(B): s(t) = \sigma(t) + k_I \cdot \int_{t_0}^{t} \sigma(t) dt$$

wherein:
s(t): switching function
$k_I$: constant $$(C): \lambda = \frac{x_v(t) - x_w(t)}{x_v(t)}$$

wherein:
$\lambda$: wheel slip ratio.

3. An antilock brake device as defined in claim 2, wherein said brake torque target value is determined by the following equation (D):

$$(D): u_{cmd}(t) = J_W \cdot q(t)$$

wherein:

$$q(t) = \begin{cases} q^+ & s(t) > \delta \\ f(s) & 0 \leq s(t) \leq \delta \\ q^- & s(t) < 0 \end{cases}$$

$J_W$, $q^+$, $q^-$, $\delta$: constants
$u_{cmd}(t)$: brake torque target value
f(s): monotonic increasing function, $f(0) = q^-$, $f(\delta) = q^+$.

4. An antilock brake device comprising:

a first sensor for detecting a wheel speed, a second sensor for detecting a vehicle speed, a third sensor for detecting a wheel angular acceleration, a controller configured to:

calculate a wheel slip ratio from said wheel speed and said vehicle speed, set a switching function which takes a positive value when said wheel slip ratio is less than said target value, and which takes a negative value when said wheel slip ratio is larger than said target value, compute a brake torque target value according to the value of said switching function, and correct said brake torque target value by a correction value according to said angular acceleration, and said brake devise further comprising:

a brake torque generating mechanism for generating a brake torque corresponding to said brake torque target value.

5. An antilock brake device as defined in claim 4 wherein said switching function and said wheel slip ratio are defined by the following eqations (E) and (F):

$$(E): s(t) = \eta \cdot x_V(t) + x_W(t)$$

wherein:
$\eta = \lambda_0 - 1$
s(t): switching function
$x_V(t)$: vehicle speed
$x_W(t)$: wheel speed $\lambda_0$: target wheel slip ratio $$(F): \lambda_i = \frac{x_v(t) - x_w(t)}{x_v(t)}$$

wherein:

$\lambda$: wheel slip ratio.

6. An antilock brake device as defined in claim 5, wherein the computation and correction of said brake torque target value are performed by the following equation (G):

$$(G): u_{cmd}(t) = J_W\{v(t) + k_W \dot{x}_W\}$$

wherein:

$$v(t) = \begin{cases} v^+ & s(t) > 0 \\ v^- & s(t) < 0 \end{cases}$$

$J_W$, $v^+$, $v^-$, $k_W$: constants
$\dot{x}_W$: wheel angular acceleration $u_{cmd}(t)$: brake torque target value.

7. A method of generating brake torque applied to an antilock brake device, comprising:

a) detecting a wheel speed, b) detecting a vehicle speed, c) calculating a wheel slip ratio from said wheel speed and said vehicle speed, d) setting a determining function which takes a positive value when said wheel slip ratio is less than said target value, and which takes a negative value when said wheel slip ratio is larger than said target value, e) setting a switching function comprising a time integral of said determining function, f) determining a brake torque target value according to the value of said switching function, and g) generating a brake torque corresponding to said brake torque target value.

* * * * *